US011872981B2

(12) United States Patent
Stefan et al.

(10) Patent No.: US 11,872,981 B2
(45) Date of Patent: Jan. 16, 2024

(54) OPERATING A MOTOR VEHICLE WITH ONBOARD AND CLOUD-BASED DATA

(71) Applicant: FORD GLOBAL TECHNOLOGIES, LLC, Dearborn, MI (US)

(72) Inventors: Frederic Stefan, Aachen (DE); Christoph Arndt, Moerlen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 248 days.

(21) Appl. No.: 17/318,253

(22) Filed: May 12, 2021

(65) Prior Publication Data

US 2021/0354685 A1 Nov. 18, 2021

(30) Foreign Application Priority Data

May 15, 2020 (DE) .......................... 102020206134.3

(51) Int. Cl.
*B60W 30/02* (2012.01)
*H04W 4/46* (2018.01)
*B60W 50/10* (2012.01)

(52) U.S. Cl.
CPC ............ *B60W 30/02* (2013.01); *B60W 50/10* (2013.01); *H04W 4/46* (2018.02); *B60W 2555/00* (2020.02)

(58) Field of Classification Search
CPC .... B60R 1/00; B60R 2300/301; G06V 20/54; G06V 20/56; G08G 1/04; G08G 1/162; G08G 1/168
See application file for complete search history.

(56) References Cited

U.S. PATENT DOCUMENTS

| 8,179,241 | B2 | 5/2012 | Sakai et al. |
| 8,936,056 | B2 | 1/2015 | Arnold et al. |
| 9,403,482 | B2 * | 8/2016 | Shahraray ............. H04W 4/021 |
| 9,805,601 | B1 * | 10/2017 | Fields .................. G08G 1/0129 |
| 10,496,890 | B2 * | 12/2019 | Boss ........................ B60R 1/00 |
| 2014/0309816 | A1 * | 10/2014 | Stefan ................... B60W 50/10 |
| | | | 701/2 |
| 2016/0075335 | A1 * | 3/2016 | Arndt ................ B60W 50/0097 |
| | | | 701/96 |
| 2016/0207528 | A1 * | 7/2016 | Stefan ................... B60W 30/06 |

(Continued)

*Primary Examiner* — Peter D Nolan
*Assistant Examiner* — Wae L Louie
(74) *Attorney, Agent, or Firm* — Frank L. Lollo; MacMillan, Sobanski & Todd, LLC

(57) ABSTRACT

A driver assistance system for a motor vehicle performs a maneuver using a trajectory determined according to an external environment. The vehicle has a plurality of environment sensors and a controller device configured to acquire an environment data set (UDS) using the environment sensors, which it transmits to a cloud computer. The cloud computer reads in the environment data set (UDS), generates a supplemental data set (EDS) for supplementing the environment data set (UDS), combines the environment data set (UDS) with the supplemental data set (EDS) in order to generate a supplemented environment data set (UDS'), and transmits the supplemented environment data set (UDS') to the controller device. The supplemental data set (EDS) may be obtained by evaluating data of other road users within a predetermined radius of the vehicle. The controller device evaluates the supplemented environment data set (UDS') for the purpose of controlling the trajectory.

15 Claims, 5 Drawing Sheets

(56) References Cited

U.S. PATENT DOCUMENTS

| | | | | |
|---|---|---|---|---|
| 2016/0339840 A1* | 11/2016 | Stefan | ................... | G08G 1/04 |
| 2018/0050675 A1* | 2/2018 | Stefan | ................... | G01C 21/26 |
| 2021/0354685 A1* | 11/2021 | Stefan | ................... | H04W 4/46 |
| 2022/0289252 A1* | 9/2022 | Liu | ................... | G08G 1/096783 |
| 2023/0066337 A1* | 3/2023 | Stefan | ................... | G06N 3/09 |

* cited by examiner

OPERATING A MOTOR VEHICLE WITH ONBOARD AND CLOUD-BASED DATA

CROSS REFERENCE TO RELATED APPLICATIONS

This application claims priority to application Ser. No. 102020206134.3, filed in the German Patent and Trademark Office on May 15, 2020, which is incorporated herein by reference in its entirety.

STATEMENT REGARDING FEDERALLY SPONSORED RESEARCH

Not Applicable.

BACKGROUND OF THE INVENTION

The present invention relates to a method for operating a motor vehicle.

As the number of driver-assistance systems continues to increase, providing ever more automated driving functions, there is a growing need for highly accurate sensor data.

In the case of driver-assistance systems, for example, automated parking assistants or an automated trajectory planning function, it is very important to have an accurate and complete representation of the environment of the motor vehicle before performing a driving maneuver (e.g., during a planning phase), as well as during the implementation of the driving maneuver, e.g., when maneuvering.

Since these driving maneuvers are performed automatically (i.e., without driver intervention), unreliable or undetected obstacles may result in collisions. In the case of a parking assistant, for example, it may be a challenge for conventional ultrasonic sensors to detect low obstacles that are situated below the bumpers of the motor vehicle. Therefore, the driver must also monitor the environment of the motor vehicle and intervene if necessary.

In recent years, great progress has been made in sensor technology, in particular relating to cameras and Lidar sensors, and in the field of corresponding signal processing, for example, deep learning or hardware components such as GPUs. The cost of camera sensors has decreased significantly, while the cost of high-resolution Lidar remains extremely high. In addition, these sensor technologies require special installation in the vehicle bodywork. For example, it must be ensured that the camera lenses remain clean in order to avoid malfunctions, and special control units and software are required, resulting in additional costs and additional power consumption.

U.S. Pat. Nos. 8,179,241B2, 9,403,482B2, and 10,496,890B2 and patent application publication US2016/0339840A1 respectively disclose systems and methods for supplementing environment data acquired by environment sensors of a motor vehicle, which may include an improved environment data set that is representative of the environment of the motor vehicle by compensating for shadows or voids or blind spot areas in the sensor field. To achieve this, sensor data are used that are obtained from other road users, an infrastructure, or smartphones of pedestrians.

U.S. Pat. No. 9,836,056B2 discloses a system and method in which, in addition, a forecast data set is provided that is representative of the environment of the motor vehicle for a brief future time window having a duration of several seconds. The forecast data set is representative of a simulated 3D environment.

However, the disclosed systems take up computing resources of the motor vehicle and also increase the power consumption of the motor vehicle.

Therefore, there is a need to identify ways to remedy this situation.

SUMMARY OF THE INVENTION

An object of the present invention is achieved via a method for operating a motor vehicle, comprising the steps of acquiring an environment data set using environment sensors of the motor vehicle, transferring the environment data set to a cloud computer, generating a supplemental data set for supplementing the environment data set by means of the cloud computer, supplementing the environment data set with the supplement data set in order to generate a supplemented environment data set by means of the cloud computer, and transferring the supplemented environment data set to the motor vehicle.

The environment data set may be raw data or processed sensor data from environment sensors, for example, camera, ultrasonic, radar, or Lidar sensors, of the motor vehicle. The environment data set is transmitted to a cloud computer via a wireless data transmission link, for example, a 5G connection. The cloud computer may be a computer or a network made up of several computers, i.e., an IT infrastructure that, for example, is made available via the Internet. It generally includes storage space, computing power, or application software as a service. Thus, outsourced to a cloud, sensor data of an environment data set is fused with a supplemental data set determined by the cloud computer, and the correspondingly supplemented environment data set is re-transmitted wirelessly to the motor vehicle. Thus, it is possible to conserve the motor vehicle's computing resources, and additional sensor data sources can be used simultaneously, thus reducing the power requirements of the motor vehicle and increasing the quality of the sensor data.

According to one embodiment, the motor vehicle transmits a state data set to the cloud computer that is indicative of a state of the motor vehicle. The state of the motor vehicle may be its position, driving direction, and/or driving speed. In other words, the state data set comprises position data and/or driving direction data and/or driving speed data of the motor vehicle, and thus allows a simple mapping of additional sensor data in order to form the supplemental data set.

According to a further embodiment, data to be supplemented are identified in the environment data set, and the cloud computer evaluates the environment data set when determining the supplemental data set. In other words, areas that are indicative of shadows or voids or blind spot areas in the environment sensor field are correspondingly identified. This may take place in the cloud computer in the cloud after the transfer to the cloud computer, or alternatively in the motor vehicle or on the motor vehicle side before the transfer to the cloud computer. This reduces the computing effort for the cloud computer or on the cloud side, as it is thus possible to determine the data to be supplemented in a particularly simple and resource-conserving manner.

According to a further embodiment, the supplemented environment data set is a 4D data set. "4D" is to be understood to be an extension of the representation of bodies in 3D space having the coordinates x, y, and z by a further auxiliary dimension; in particular, a time dimension. Thus, the 4D data set is representative of a period of time within a future time window. The data set may also be considered to be a forecast data set that is representative of the environment of the motor vehicle. Therefore, the computing effort required for determining the future behavior of other road users may be shifted to the cloud computer, thus further reducing the power requirements of the motor vehicle, and further increasing the quality of the sensor data.

According to further embodiment, the supplemental data set is determined by evaluating data of other road users. For this purpose, for example, it is determined whether other road users are located within a predetermined area around the motor vehicle, and data sets of respective ones of the other road users are downloaded from their motor vehicles, in a manner analogous to that of the environment data set. Thus, additional data are provided virtually by means of an exchange of environment data sets between the motor vehicle and the other road users, thus further increasing the quality of the sensor data.

Furthermore, the present invention comprises a computer program product for a motor vehicle, a computer program product for a cloud computer, a control device, a motor vehicle comprising such a control device, a cloud computer, and a system comprising such a motor vehicle and comprising such a cloud computer.

DETAILED DESCRIPTION OF PREFERRED EMBODIMENTS

Figure 1:
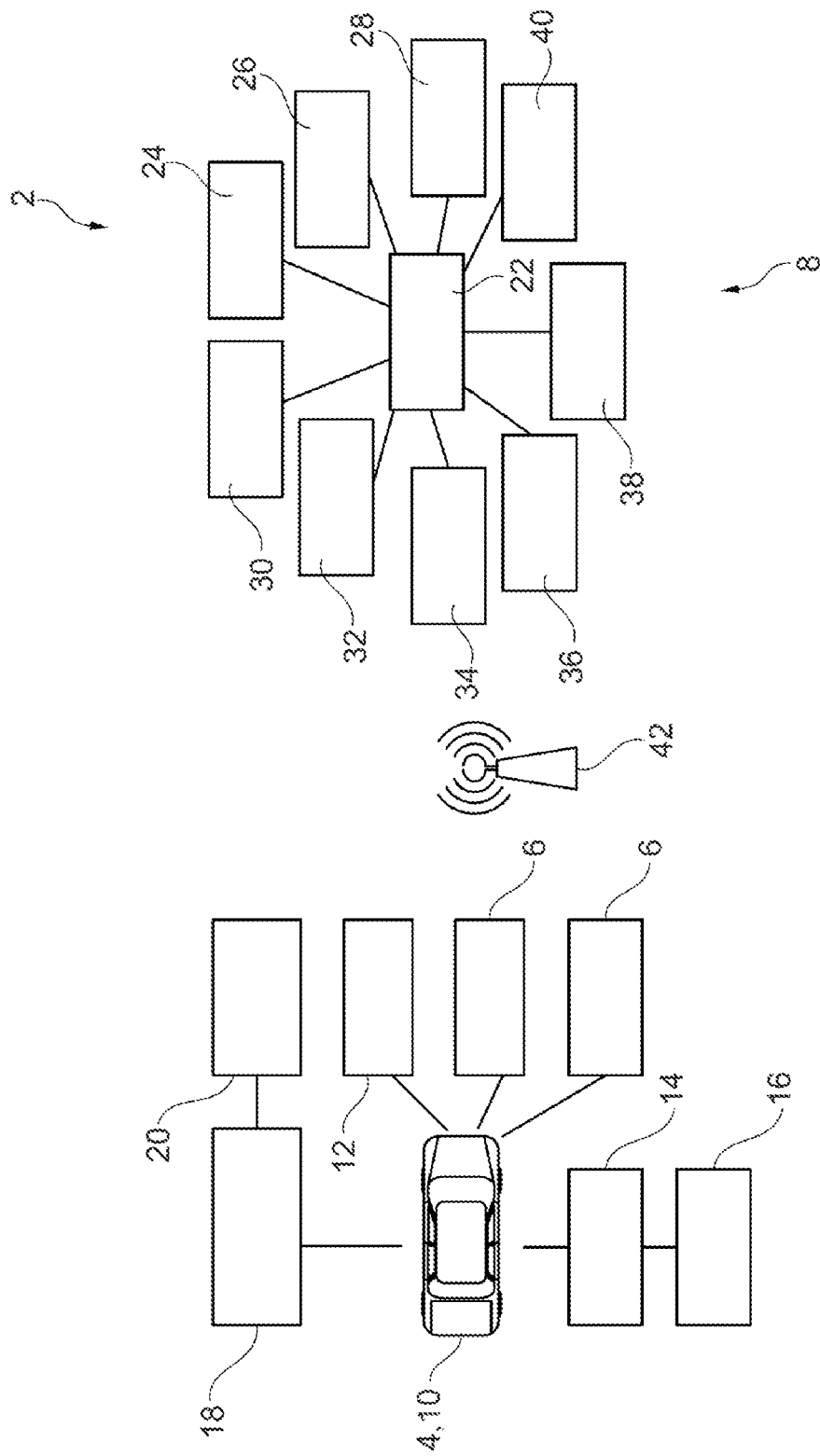
FIG. 1 is a schematic representation of a system comprising a motor vehicle and a cloud computer.
Figure 2:
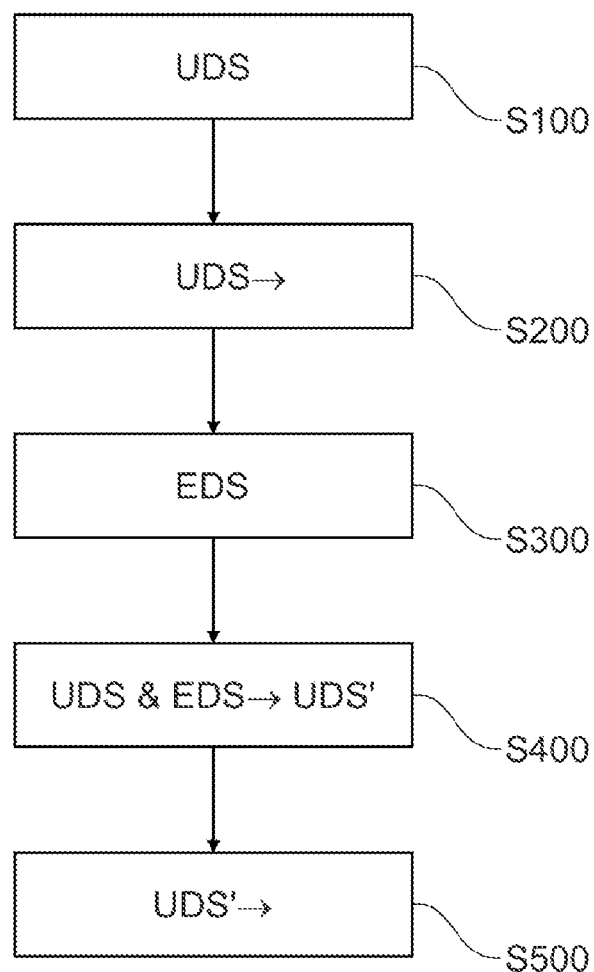
FIG. 2 is a flowchart showing a first part of a method sequence for operating the system depicted in FIG. 1.
Figure 3:
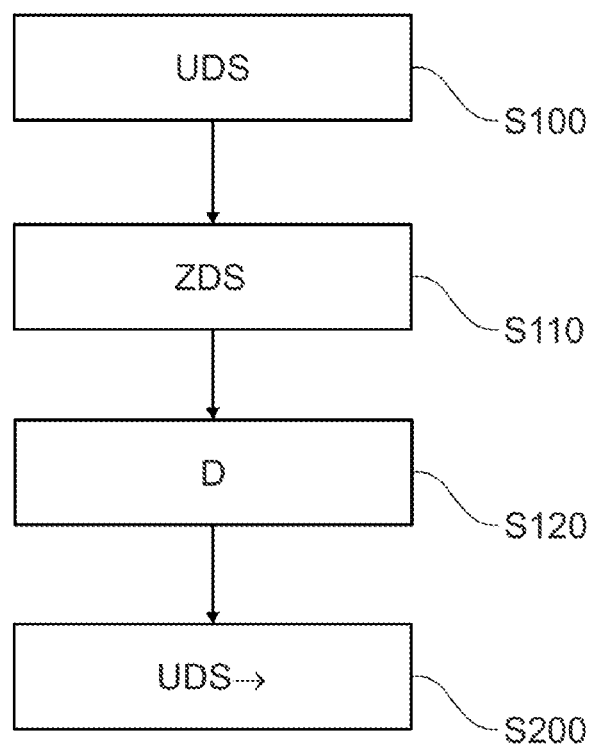
FIG. 3 is a flowchart showing a further part of a method sequence for operating the system depicted in FIG. 1.
Figure 4:
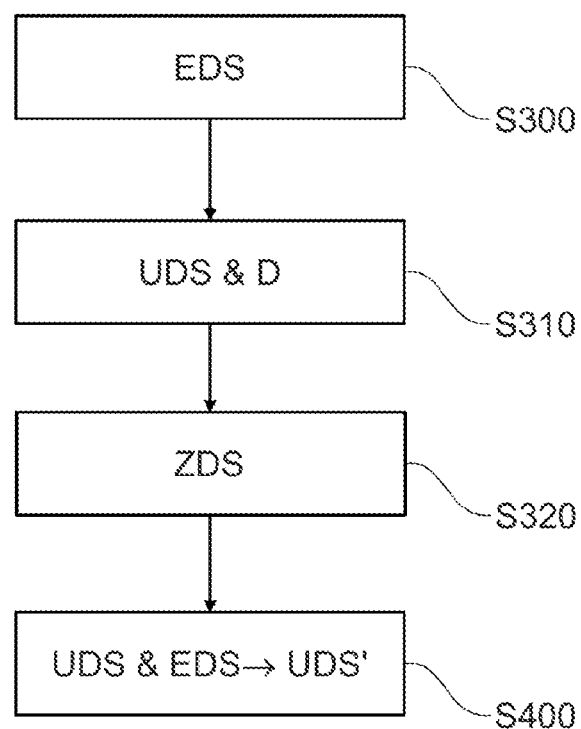
FIG. 4 is a flowchart showing a further part of a method sequence for operating the system depicted in FIG. 1.
Figure 5:
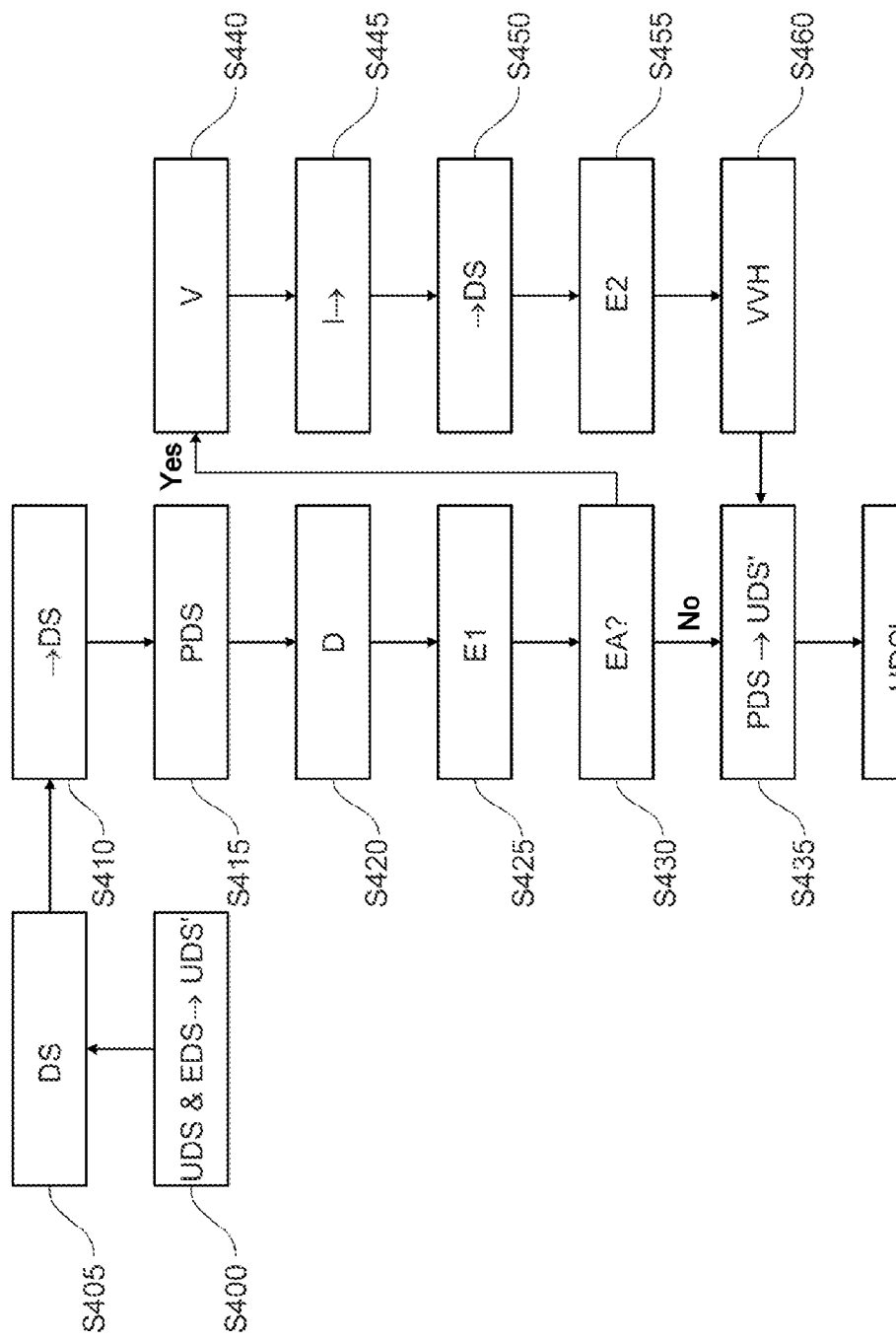
FIG. 5 is a flowchart showing a further part of a method sequence for operating the system depicted in FIG. 1.

Reference will first be made to FIG. 1. A system 2 is depicted which comprises a motor vehicle 4 and a cloud computer 8.

The motor vehicle 4 and the cloud computer 8, as well as their respective components described below, may comprise hardware and/or software components for performing the tasks and functions described below.

In the present exemplary embodiment, the motor vehicle 4 is configured as a passenger car and comprises at least one driver-assistance system 16, such as an automatic parking assistant or another driver-assistance system having an automatic trajectory planning function. For example, the motor vehicle 4 may be configured as a self-driving motor vehicle in compliance with SAE (J3016), according to one of the SAE stages 1 to 5.

A motor vehicle-side transceiver 12 of the motor vehicle 4 allows an environment data set UDS to be transmitted to the cloud computer 8 via a wireless data link 42. Furthermore, the motor vehicle-side transceiver 12 may receive a supplemented environment data set UDS' that is provided from the cloud computer 8 and transmitted back to motor vehicle 4 via the wireless data link 42.

Furthermore, the motor vehicle 4 comprises environment sensors 6. The environment sensors 6 may be comprised of actual physical sensors for acquiring environment data, for example, camera, ultrasonic, radar, or Lidar sensors, or positioning systems such as GPS. Furthermore, the environment sensors 6 may also be comprised of virtual sensors that provide sensor data in a manner similar to that of the supplemented environment data set UDS'. The supplemented environment data set UDS' may be a 4D data set that is representative of a period of time within a future time window. The 4D data set may be configured as a forecast data set that is representative of the environment of the motor vehicle 2.

An evaluation unit 14 of the motor vehicle reads in the raw sensor data of the environment sensors 6 and evaluates said data in order to create a 2D or 3D image data set that is representative of an environment of the motor vehicle 4 within a predetermined radius around the motor vehicle 4 and for a predetermined time window. In the present exemplary embodiment, the evaluation unit 14 generates, for example, a 3D point cloud data set having a radius of 50 meters around the motor vehicle 4 (e.g., depicting obstacles and/or open areas).

An environment 18 is the actual world environment in which the motor vehicle 4 moves, and comprises infrastructure facilities, roads, and other road users.

An environment data transmitter 20 is configured to transmit supplemental information about the environment 18, said information being characterized by external sensors (not by the motor vehicle 4). This information may be evaluated and transmitted via V2x communication (e.g., from smartphones of pedestrians) and evaluated at the receiver.

A virtual platform 22 resides on the cloud computer 8 and is configured to supplement incomplete physical sensor data with additional external sensor data, simulated sensor data, and forecast sensor data. In other words, in the present exemplary embodiment, a supplemental data set EDS is generated on the virtual platform 22, and an environment data set UDS is supplemented with the supplemental data set EDS in order to be able to provide a supplemented environment data set UDS', as will be explained below in greater detail.

A 3D simulation model 24 of the virtual platform 22 provides an environment that is capable of performing traffic and mobility-oriented simulations in 3D. The 3D simulation model 24 may comprise a game engine and/or a traffic simulator for this purpose.

A reconstruction model 26 of the virtual platform 22 is configured to determine a first image data set of the environment of the motor vehicle 4, a second, extended image data set of the environment of the motor vehicle 4, and a forecast image data set of the environment of the motor vehicle 4. The determination is based on an x, y, z coordinate system.

A traffic forecast model 28 of the virtual platform 22 is configured to simulate the traffic events in the environment of the motor vehicle 4 in the 3D simulation model 24, for a brief time window extending into the future.

This simulation is based on the provided sensor data. The traffic forecast model 28 may comprise a physics engine in order to forecast the trajectories of the motor vehicle 4 and all virtual road users on the basis of their known position, speeds, and potential route (e.g., navigation data).

A 3D data set 30 is representative of a complete 3D image of static components of the environment of the motor vehicle 4, based on the current position of the motor vehicle 4. Based, for example, on GPS coordinates of the motor vehicle 4 (for example, differential GPS having an accuracy of 10 cm), the 3D coordinates of streets, buildings, infrastructure facilities, trees, etc. around the motor vehicle 4 may be queried, for example, from a 3D map database (for example, OpenDrive, OpenStreetMap, Pegasus, . . . ).

A localization module 32 is configured to provide position data that are indicative of the current position of the motor vehicle 4. The motor vehicle's 4 differential GPS may be used for this purpose.

An environment data transceiver 34 is configured for exchanging sensor data with road users same area as the motor vehicle 4, according to the position data.

The environment data transmitter 34 may request specific sensor data from other road users, for example, their position, dimensions, speeds, and/or directions of movement, via I2x or V2x or smartphones.

A cloud-side transceiver 36 is configured for exchanging data with the motor vehicle 4. Sensor data may thus be requested from the motor vehicle 4 in order to transmit an improved image of the environment and a forecast of the environment around motor vehicle 4 to the motor vehicle 4.

A physics engine 38 is a software module that is configured to determine the behavior of all moving elements (that can be considered to be rigid bodies), according to the laws of physics. The physics engine may, for example, be PhysX from NVDIA.

A forecast module 40 is configured to carry out an exploration based on sensor data that are indicative of a current state and a past, in order to provide a 4D data set that is indicative of an environment of the motor vehicle 4 for a brief period of time in the future.

A method sequence for operating the system 2 depicted in FIG. 1 will now be explained, making additional reference to FIGS. 2 to 5.

The method may be initiated in response to a request by a request signal, for example, in response to an activation of the driver-assistance system 16; or the method is carried out continuously without interruption in order to provide the supplemented environment data set UDS'.

In a first step S100, a control device 10 of the motor vehicle 4 triggers the evaluation unit 14 to read in the raw sensor data of the environment sensors 6, and combines these raw sensor data into the environment data set UDS. The environment data set UDS may be a 2D or 3D image data set that is representative of an environment of the motor vehicle 4.

Furthermore, in a further substep S110 (FIG. 3), the control device 10 activates the evaluation unit 14 in such a way that said evaluation unit generates the state data set ZDS that is indicative of a state of the motor vehicle 4. In the present exemplary embodiment, the state data set ZDS comprises position data and/or driving direction data and/or driving speed data of the motor vehicle 4.

In addition, in a further substep S120, the control device 10 activates the evaluation unit 14 in such a way that said evaluation unit determines data D that are to be supplemented in the environment data set UDS and that are indicative of shadows or voids or blind spot areas said data in the environment data set UDS and flags.

In a further step S200, the control device 10 causes the environment data set UDS to be transmitted to the cloud computer 8 by means of the wireless data link 42.

In a further step S300, the cloud computer 8 generates the supplemental data set EDS for supplementing the environment data set UDS.

For this purpose, in a first substep S310, the cloud computer 8 determines which data are missing by evaluating the environment data set UDS comprising the data to be supplemented D, in order to fill in the shadows or voids or blind spot areas.

Furthermore, in a further substep S320, the cloud computer 8 determines relevant position data and/or driving direction data and/or driving speed data of the motor vehicle 4 by evaluating the state data set ZDS. This makes it possible to determine which data sources could be considered for use as a source for the data D to be supplemented. In other words, data sources that the motor vehicle 4 has already driven past are discarded.

In a further step S400, the cloud computer 8 supplements the environment data set UDS with the supplemental data set EDS and thus generates the supplemented environment data set UDS'.

For this purpose, in a first substep S405, in the 3D simulation model 24, the cloud computer 8 reconstructs a 3D scene or a data set DS that is representative thereof around the motor vehicle 4, based on the environment data set UDS and the state data set ZDS.

In a further substep S410, the motor vehicle 4 is then virtually embedded into the 3D scene or the data set DS that is representative thereof.

In a further substep S415, the cloud computer 8 reconstructs a first virtual version of a point cloud data set PDS, based on the data set DS around the motor vehicle 4 in the 3D simulation model 24, by means of the reconstruction module 26.

In a further substep S420, the cloud computer 8 determines the data D that are to be supplemented and that are indicative of shadows or voids or blind spot areas, by evaluating the first virtual version of the point cloud data set PDS.

In a further substep S425, the cloud computer 8 carries out a first supplementation E1 of the virtual version of the point cloud data set PDS, and adds information to the 3D scene or the data set DS that is representative thereof, for example, additional echoes from curbs, buildings, trees, etc.

In a further substep S430, it is checked whether the point cloud data set PDS includes any sections EA that are still to be supplemented.

If the point cloud data set PDS comprises no sections EA to be supplemented, in a further substep S435, the supplemented environment data set UDS' is generated, based on a point cloud data set PDS, and the method continues with a step S500.

In the further step S500, the supplemented environment data set UDS' is transmitted to the motor vehicle 4 by means of the wireless data link 42.

However, if the point cloud data set PDS still includes any sections EA to be supplemented, the method is continued with a further substep S440.

In the further substep S440, on the basis, inter alia, of the position data, the cloud computer 8 determines other road users V that are at a predetermined distance or a predetermined travel time away from the motor vehicle 4.

In a further substep S445, the cloud computer 8 transmits an information query I to the detected road users V, for example, within the predetermined distance, for example, by means of the environment data transmitter 34. Thus, inter alia, relevant position data and/or driving direction data and/or driving speed data of other road users V, in other words, data of an analog state data set of the respective detected road user V, are queried.

In a further intermediate step S450, the data obtained by means of the information query I are embedded into the 3D scene or the data set DS that is representative thereof.

In a further substep S455, the cloud computer 8 performs a further supplementation E2 of the virtual version of the point cloud data set PDS, and adds the data of the other road users V obtained by means of the information query I to the 3D scene or data set DS that is representative thereof. In other words, the obtained data are analogous point cloud data sets and/or environment data sets of the respective road users V.

A further substep S460 may be provided, in which a traffic forecast VVH provided by the traffic forecast model 28 is taken into consideration, and/or is transmitted wirelessly to the motor vehicle 4.

Then, in a manner analogous to the above embodiments, in the further substep S435, the supplemented environment data set UDS' is generated based on the point cloud data set PDS, and in the further step S500, the supplemented environment data set UDS' is then transmitted to the motor vehicle 4 by means of the wireless data link 42.

The supplemented environment data set UDS' is then associated with the environment sensors 6 in the form of sensor data of virtual sensors, and is evaluated in order to be able to operate the driver-assistance system 16.

In deviation from the present exemplary embodiment, the sequence of steps and/or substeps may also be different. Furthermore, several steps and/or substeps may be performed concurrently or simultaneously. In addition, individual steps may also be omitted.

The computer resources of the motor vehicle 4 may thereby be conserved, and additional sensor data sources may be used at the same time, thus reducing the power requirements of the motor vehicle 4 and increasing the quality of the data sensors.

Reference characters in the specification and drawings are as follows: System 2; Motor vehicle 4; Environment sensor 6; Cloud computer 8; Control device 10; Motor vehicle-side transceiver 12; Evaluation unit 14; Driver-assistance system 16; Environment 18; Environment data transceiver 20; Virtual platform 22; 3D simulation module 24; Reconstruction module 26; Traffic forecast model 28; 3D data set 30; Localization module 32; Environment data transceiver 34; Cloud-side transceiver 36; Physics engine 38; Forecast module 40; Wireless data link 42; Data to be supplemented D; Data set DS; Supplementation E1; Supplementation E2; Segments to be supplemented EA; Supplemental data set EDS; Information query I; Point cloud data set PDS; Road user V; Traffic forecast VVH; Environment data set UDS; Supplemented environment data set UDS'; and State data set ZDS.

What is claimed is:

1. A motor vehicle system comprising:
a plurality of environment sensors on a vehicle;
a transceiver on the vehicle;
a driving-maneuver assistance system using a trajectory determined according to an external environment;
a controller device on the vehicle configured to acquire an environment data set (UDS) using the environment sensors; and
a cloud computer remote from the vehicle having a supplemental data set (EDS) which includes environmental information characterized by external sensors not on the vehicle, wherein the controller device transmits the environment data set (UDS) to the cloud computer, and wherein the cloud computer is configured 1) to read in the environment data set (UDS), 2) to generate a supplemental data set (EDS) for supplementing the environment data set (UDS) using a mapping of the environment data set (UDS) to the supplemental data set (EDS), 3) to combine the environment data set (UDS) with the supplemental data set (EDS) in order to generate a supplemented environment data set (UDS'), and 4) to transmit the supplemented environment data set (UDS') to the controller device on the vehicle;
wherein the controller device is configured to evaluate the supplemented environment data set (UDS') for controlling the trajectory.

2. The motor vehicle system of claim 1 wherein the controller device is configured to transmit a state data set (ZDS) that is indicative of a state of the motor vehicle to the cloud computer, and wherein the cloud computer generates the supplemental data set (EDS) at least in part based on the state data set (ZDS).

3. The motor vehicle system of claim 1 wherein the controller device is configured to identify missing data (D) to be supplemented in the environment data set (UDS).

4. The motor vehicle system of claim 1 wherein the supplemented environment data set (UDS') is a 4D data set.

5. The motor vehicle system of claim 1 wherein the cloud computer is configured to determine the supplemental data set (EDS) by evaluating data of other road users within a predetermined radius of the vehicle.

6. A method for operating a motor vehicle, comprising the steps of:
acquiring an environment data set (UDS) using environment sensors of the motor vehicle;
transmitting the environment data set (UDS) to a cloud computer;
generating a supplemental data set (EDS) by the cloud computer for supplementing the environment data set (UDS), wherein the supplemental data set (EDS) includes environmental information characterized by external sensors not on the vehicle, and wherein the supplemental data set (EDS) for supplementing the environment data set (UDS) is selected using a mapping of the environment data set (UDS) to the supplemental data set (EDS);
combining the environment data set (UDS) with the supplemental data set (EDS) in order to generate a supplemented environment data set (UDS'); and
transmitting the supplemented environment data set (UDS') to the motor vehicle for use in a driver assistance function of the motor vehicle.

7. The method of claim 6, further comprising the step of the motor vehicle transmitting a state data set (ZDS) to the cloud computer that is indicative of a movement state of the motor vehicle.

8. The method of claim 6, further comprising the step of identifying data (D) to be supplemented in the environment data set (UDS), wherein the cloud computer evaluates the data (D) and the environment data set (UDS) when determining the supplemental data set (EDS).

9. The method of claim 6, wherein the supplemented environment data set (UDS') is a 4D data set.

10. The method of claim 6, wherein the supplemental data set (EDS) is determined by evaluating data of other road users (V).

11. A non-transitory computer readable media program product executable by one or more processors, configured to cause the one or more processors to execute operations comprising:
acquiring an environment data set (UDS) using environment sensors of a motor vehicle;
transmitting the environment data set (UDS) to a cloud computer;
generating a supplemental data set (EDS) by the cloud computer for supplementing the environment data set (UDS), wherein the supplemental data set (EDS)

includes environmental information characterized by external sensors not on the vehicle, and wherein the supplemental data set (EDS) for supplementing the environment data set (UDS) is selected using a mapping of the environment data set (UDS) to the supplemental data set (EDS);

combining the environment data set (UDS) with the supplemental data set (EDS) in order to generate a supplemented environment data set (UDS'); and transmitting the supplemented environment data set (UDS') to the motor vehicle for use in a driver assistance function of the motor vehicle.

12. The computer readable media program product of claim 11, wherein the operations further comprise the motor vehicle transmitting a state data set (ZDS) to the cloud computer that is indicative of a movement state of the motor vehicle.

13. The computer readable media program product of claim 11, wherein the operations further comprise identifying data (D) to be supplemented in the environment data set (UDS), wherein the cloud computer evaluates the data (D) and the environment data set (UDS) when determining the supplemental data set (EDS).

14. The computer readable media program product of claim 11, wherein the supplemented environment data set (UDS') is a 4D data set.

15. The computer readable media program product of claim 11, wherein the supplemental data set (EDS) is determined by evaluating data of other road users (V).

* * * * *